United States Patent [19]

Warner

[11] Patent Number: 4,953,903
[45] Date of Patent: Sep. 4, 1990

[54] TOOL TO ASSIST ATTACHING FABRIC TOP TO VEHICLE BODY

[76] Inventor: David M. Warner, 2830 Palmer Dr., Hollywood, Fla. 33021

[21] Appl. No.: 341,411

[22] Filed: Apr. 21, 1989

[51] Int. Cl.[5] .......................... B25B 25/00; B60J 7/12; B66F 19/00
[52] U.S. Cl. .................... 294/1.1; 24/68 D; 81/486; 81/488; 254/1; 254/133 R; 296/107
[58] Field of Search .................. 294/1.1, 15, 26, 74, 294/82.1, 82.11, 82.12, 132–136, 137, 149; 24/68 R, 68 CD, 68 D, 68 F, 69 CT, 69 CF, 71 ST, 71 TD, 71.3, 265 R, 265 H, 265 CD; 81/486, 488; 224/0.5, 42.39, 42.4, 273; 254/1, 131, 133 R, 134, 199, 262, 264–265; 292/288; 296/107, 108, 112, 115, 216, 223

[56] References Cited

U.S. PATENT DOCUMENTS

| | | | |
|---|---|---|---|
| 1,007,019 | 10/1911 | Wright | 294/26 X |
| 1,070,672 | 8/1913 | Dreyer | 24/69 CT |
| 1,139,526 | 5/1915 | Holicky | 294/1.1 |
| 1,557,985 | 10/1925 | Condra | 254/1 |
| 1,713,238 | 5/1929 | Otte | 294/82.11 X |
| 2,754,149 | 7/1956 | McGrath et al. | 296/107 |
| 2,835,154 | 5/1958 | Geller | 24/68 D X |
| 2,919,946 | 1/1960 | Miener | 224/42.4 X |
| 2,983,413 | 5/1961 | Verwers | 224/42.4 X |
| 3,125,907 | 3/1964 | Derrickson | 81/488 |
| 3,328,064 | 6/1967 | Simon | 294/74 X |
| 3,526,427 | 9/1970 | Trenkler | 296/137 |
| 4,260,188 | 4/1981 | Bauer | 296/107 |
| 4,264,055 | 4/1981 | Strange | 254/243 |
| 4,377,886 | 3/1983 | Golden | 24/68 CD X |

Primary Examiner—Johnny D. Cherry
Attorney, Agent, or Firm—Oltman and Flynn

[57] ABSTRACT

A tool for assisting a person to attach the fabric top of a utility or military vehicle, such as a JEEP, to the back of the vehicle body. The tool is an adjustable length flexible belt with a loop at its lower end. A rigid hook member is attached to the upper end of the belt. The hook member fits over the usual rear cross rod over which the fabric top passes from front-to-back and down to the back of the vehicle body. The combined length of the hook and belt is slightly less than the vertical distance of the rear cross rod on the vehicle down to the ground or other support surface on which the vehicle rests. A person using the tool pushes his foot down on the loop at the lower end of the belt, causing the belt to pull the cross rod down far enough to make it easy to attach snap fastener elements on the lower back end of the fabric top to complementary snap fastener elements on the back of the vehicle body.

9 Claims, 1 Drawing Sheet

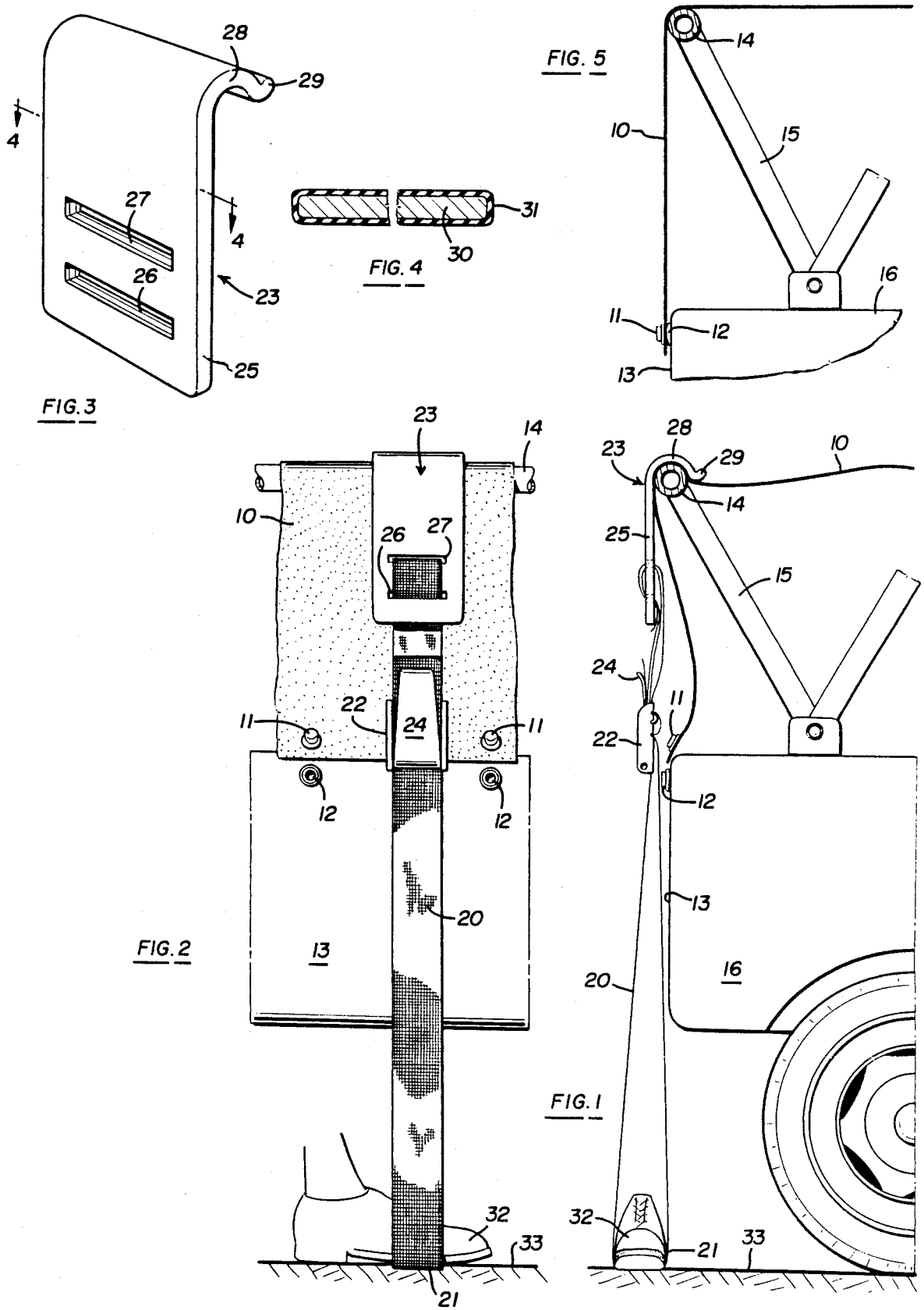

TOOL TO ASSIST ATTACHING FABRIC TOP TO VEHICLE BODY

SUMMARY OF THE INVENTION

This invention relates to a tool to assist a person to attach the usual canvas top on a utility or military vehicle, such as a "JEEP", to the back of the vehicle.

Many utility and military vehicles, such as the "JEEP", have a canvas top that extends from front to back and down behind a rear cross rod spaced above the vehicle body. At its lower back end the canvas top has snap fastener elements that are manually attachable to complementary snap fastener elements on the back of the vehicle body. The canvas top must be pulled down taut in order to bring its snap fastener elements into registration with the snap fastener elements on the back of the vehicle body, so that they can be attached. Many persons find this difficult and/or inconvenient.

The present invention is directed to a novel tool to make it easier for a person to make this attachment.

In accordance with this invention there is provided a tool having an adjustable-length belt with a loop at its lower end for receiving a person's foot and a hook member on its upper end to engage over the rear cross rod on the vehicle, with the canvas top passing over the cross rod beneath this hook member. The combined length of this belt and hook member, when the belt is pulled taut, is slightly less than the vertical distance of the rear cross rod on the vehicle down to the ground or other surface on which the vehicle rests. The person using this tool pushes down with his foot to engage the lower end loop of the belt with the ground and cause the belt to pull the rear cross rod on the vehicle down just enough to lower the fastener elements on the canvas top to where they can be easily attached to the fastener elements on the back of the vehicle body.

A principal object of this invention is to provide a novel tool to facilitate the attachment of a fabric top on a utility or military vehicle to the back of the vehicle body.

Further objects and advantages of this invention will be apparent from the following detailed description of a presently preferred embodiment which is illustrated schematically in the accompanying drawings.

DESCRIPTION OF THE DRAWING

FIG. 1 is a side elevation showing the tool of the present invention being operated by a person's foot to facilitate the attachment of the canvas top to the back of the vehicle;

FIG. 2 is an end elevation taken from in back of the vehicle;

FIG. 3 is a perspective view of the hook member in the present tool;

FIG. 4 is a cross-section through this hook member taken along the line 4—4 in FIG. 3; and FIG. 5 is a side elevation showing the canvas top attached to the back of the vehicle after the present tool has been used and removed.

Before explaining the disclosed embodiment of the present invention in detail it is to be understood that the invention is not limited in its application to the details of the particlar arrangement shown since the invention is capable of other embodiments. Also, the terminology used herein is for the purpose of description and not of limitation.

DETAILED DESCRIPTION

Referring first to FIGS. 1 and 2, an automotive vehicle of the utility or military type, such as a JEEP, typically has a flexible canvas top 10 with snap fastener elements 11 on its lower back end that are releasably attachable to complementary snap fastener elements 12 on the back 13 of the vehicle body. The canvas top extends from front to back across the top of, and then down from, a horizontal rear cross rob 14 spaced vertically above the back 13 of the vehicle body by a pair of support arms 15 which extend up from the opposite sides 16 of the vehicle body at a rearward and upward inclination. The support arms 15 are substantially rigid but they are long enough to bend slightly in response to a downward force on the cross rod 14.

The front-to-back length of the canvas top 10 is such that it is substantially taut when its fastener elements 11 are attached to the fastener elements 12 on the back of the vehicle body, as shown in FIG. 5. This requires that the canvas top be pulled tight down behind the cross rod 14 to engage its fastener elements 11 with the fastener elements 12 on the back of the vehicle. Many persons find this difficult or inconvenient to do by hand.

The tool of the present invention makes it easier to pull down the canvas top to where it can be attached to the back of the vehicle by the snap fasteners. In broad outline this tool comprises an elongated flexible belt 20 forming a loop 21 at its lower end, a buckle 22 engaging the belt and permitting its length to be adjusted, and a hook member 23 on the upper end of the belt.

The buckle 22 is of known design (the details of which are not part of the present invention), such as a buckle of the type used for seat belts on passenger airplanes. It has a pivoted handle 24 that may be pulled out to permit the length of the belt to be slidably adjusted, after which the handle may return to its normal position locking the belt in this length-adjusted position.

The hook member 23 (FIG. 3) has a flat, vertical, lower, back segment 25 with a pair of horizontally elongated, vertically narrow openings 26 and 27 spaced a short vertical distance apart in the lower half of segment 25. These openings receive the belt 20 in a known manner to connect the hook member 23 to the belt at its upper end. Joined to the upper end of back segment 25 is a generally semi-cylindrical hook segment 28. As shown in FIG. 1, the hook segment 28 fits snugly over the canvas top 10 where it passes over and down behind the rear cross rod 14. At its front side, the hook segment 28 is joined to an upwardly and forwardly incliner, rounded, end lip 29 which forces the canvas top 10 down below a horizontal position tangent to the top of the cross rod 14, which position, as shown in FIG. 5, the canvas top assumes when the hook member 23 is removed. The canvas top 10 is engaged between the hook segment 28 and the top of rear cross rod 14 over about 180 degrees of the circumference of the cross rod.

As shown in FIG. 4, the hook member 23 may have a metal core 30 covered by a coating 31 of rubber-like material to prevent rust. Alternatively, the hook member may be of a rust-resistant metal, such as stainless steel.

The combined length of hook member 23 and belt 20, when the belt is pulled taut, is slightly less than the normal vertical distance of the rear cross rod 14 down to the ground or other surface on which the vehicle rests. By "normal vertical distance" is meant the distance when there is no appreciable downward force on cross rod 14.

To use the present tool, first the canvas top 10 is pulled back over the rear cross rod 14 to a position in which its snap fastener elements 11 are above the snap fastener elements 12 on the back of the vehicle. The hook member 23 is placed over the canvas top on the rear cross rod 14, as shown in FIG. 1, with the back segment 25 of the hook extending behind the canvas hanging down from the cross rod. When a person inserts his or her foot 32 in the bottom loop 21 of the belt and pushes down, the belt 20 will become taut before this bottom loop 21 engages the ground 33. The downward force on belt 20 causes it to exert a downward pull on hook member 23 strong enough to cause the cross rod 14 to move down enough to lower the fastener elements 11 on the canvas top to the same level as the fastener elements 12 on the back of the vehicle body, so that a person can easily snap them together. Then the person removes his or her foot from the bottom loop 21 of the belt, thereby removing the downward force on cross rod 14 and permitting this cross rod and the canvas top 10 to assume the final position shown in FIG. 5. In this position, the snap fasteners 11, 12 hold the canvas top 10 fastened to the back of the vehicle and the canvas top is substantially taut.

From the foregoing it will be evident that the present tool is simple and easy to use, yet highly effective in assisting a person to attach the canvas top to the back of the vehicle.

I claim:

1. For use with a utility vehicle resting on a support surface and having:
    a back with fastener elements thereon;
    a horizontal rear cross rod spaced substantially vertically above said back of the vehicle and displaceable slightly downward by a downward force on the rear cross rod;
    and a flexible fabric top extending from front to back across the top of said rear cross rod and down behind said rear cross rod to said back of the vehicle, said fabric top having fastener elements at its lower end for attachment to said fastener elements on the back of the vehicle;
    a tool for pulling said cross rod down slightly to facilitate the attachment of said fastener elements on the fabric top to said fastener elements on the back of the vehicle comprising:
    an elongated flexible belt having upper and lower ends and having a loop at its lower end for receiving a person's foot to pull down on the belt;
    and a hook member connected to the upper end of said belt and having a lower segment extending up from said belt and an arcuate hook segment joined to the upper end of said lower segment and presenting a downwardly-facing recess for engagement over said canvas top on said cross rod;
    said hook member and belt having a combined length slightly less than the vertical distance of said rear cross rod on the vehicle down to said support surface so that, when the person's foot pulls the belt down to engage said loop with the support surface, the belt pulls said rear cross rod on the vehicle down a slight distance to lower said fastener elements on said fabric top toward said fastener elements on the back of the vehicle.

2. A tool according to claim 1 wherein said recess presented by said hook segment is substantially complementary to said cross rod and said fabric top thereon over a substantial part of the circumference of the cross rod at the top thereof.

3. A tool according to claim 2 wherein said hook member has a forwardly and upwardly inclined end lip joined to the front of said hook segment.

4. A tool according to claim 2 wherein said recess presented by said hook segment engages said fabric top over substantially half the circumference of said cross rod at the top thereof.

5. A tool according to claim 4 wherein said hook member has a forwardly and upwardly inclined end lip joined to the front of said hook segment.

6. A tool according to claim 1 and further comprising:
    means on said belt for selectively adjusting its length between said upper and lower ends.

7. A tool according to claim 6 wherein said recess presented by said arcuate hook segment is substantially complementary to said cross rod over a substantial part of the circumference of the cross rod at the top thereof.

8. A tool according to claim 7 wherein said recess presented by said hook segment engages said fabric top over substantially half the circumference of said cross rod at the top thereof.

9. A tool according to claim 8 wherein said hook member has a forwardly and upwardly inclined end lip joined to the front of said hook segment.

* * * * *